United States Patent [19]
De Lepeleire

[11] 3,853,143
[45] Dec. 10, 1974

[54] FLEXIBLE DIAPHRAGM AIR DAMPER

[75] Inventor: Guido Amandus De Lepeleire, Heverlee, Belgium

[73] Assignee: Danfoss A/S, Nordborg, Sweden

[22] Filed: May 24, 1973

[21] Appl. No.: 363,323

Related U.S. Application Data

[63] Continuation of Ser. No. 220,107, Jan. 24, 1972, abandoned.

[30] Foreign Application Priority Data
Jan. 29, 1971  Luxembourg .......................... 62512

[52] U.S. Cl. .................. 137/494, 137/802, 98/41 R
[51] Int. Cl. ............................................ G05d 7/00
[58] Field of Search .......... 137/494, 500, 503, 504, 137/521, 527, 518, 802; 251/61, 211, 25, 212; 92/34, 92, 37, 44, 43, 47; 138/45, 46; 98/41 R, 119; 236/49, 80 R

[56] References Cited
UNITED STATES PATENTS
2,924,934  2/1960  Rainbow ........................ 251/212 X
3,506,038  4/1970  Perry et al. ..................... 98/41 R X

*Primary Examiner*—Alan Cohan
*Assistant Examiner*—Robert J. Miller

[57] ABSTRACT

The present invention deals with an air damper equipped with a flexible diaphragm, to be mounted in an air conditioning plant in order to control an air flow and/or an associated pressure drop, possibly in dependence on any variable to be controlled; it deals also with a flexible bag diaphragm suitable for measuring and/or controlling appliances involving a pressure difference, for example for the aforesaid air damper. A diaphragm conforming to the present invention is characterized by its shape, the way of mounting, and the extreme flexibility of its walls, which enables its use as an adjusting element in an air damper of a new design, and this with very small pressure differences.

6 Claims, 22 Drawing Figures

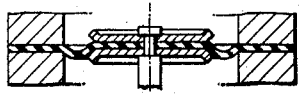
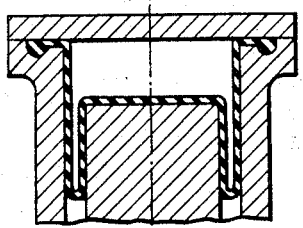
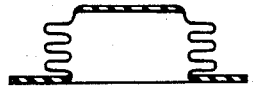
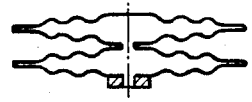
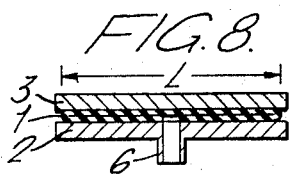
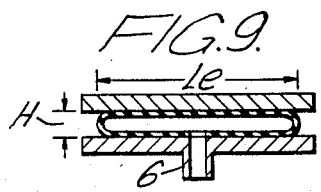
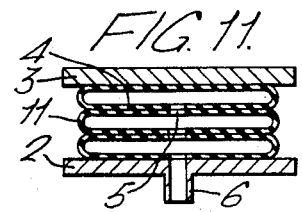
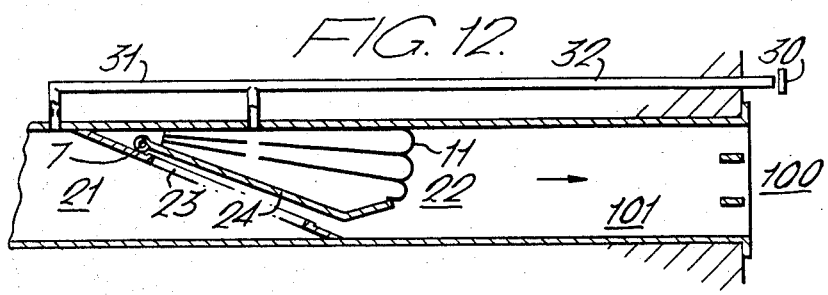
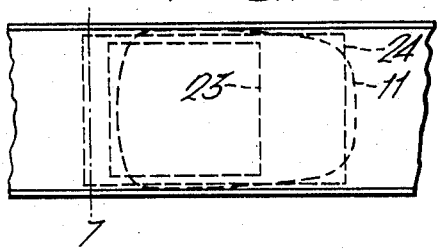

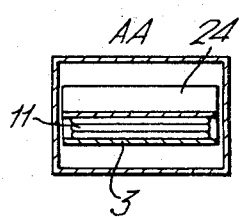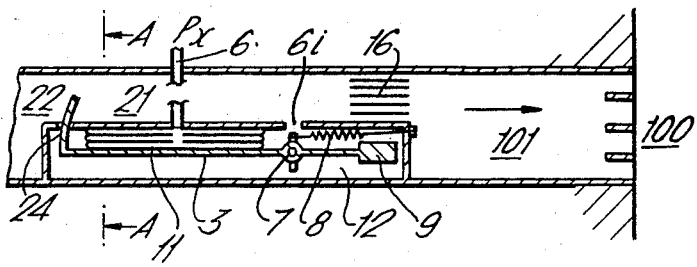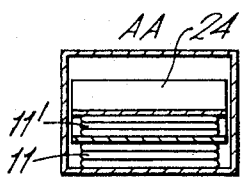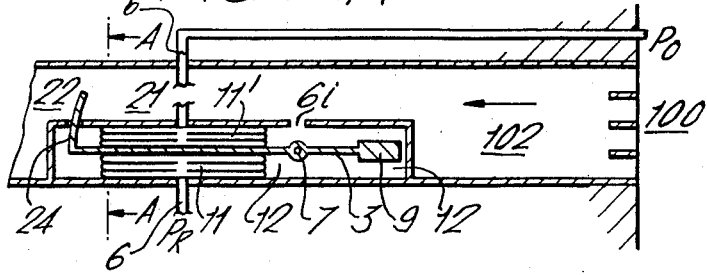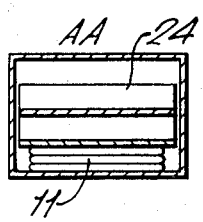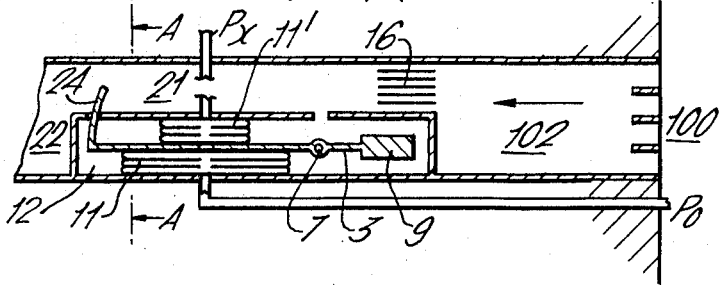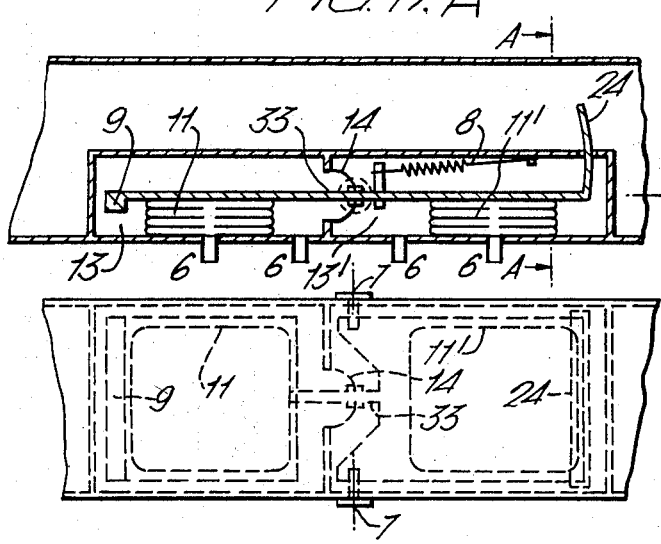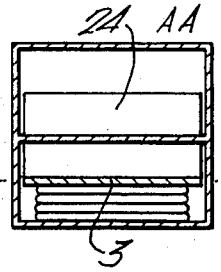

FLEXIBLE DIAPHRAGM AIR DAMPER

This is a continuation, of appln. Ser. No. 220,107, filed Jan. 24, 1972 now abandoned.

BRIEF DESCRIPTION OF THE DRAWINGS

FIGS. 1, 2, 3 and 4 show prior art forms of diaphragm assemblies;

FIGS. 5 and 6 show prior art forms of bellows assemblies;

FIGS. 7 to 11 show diaphragm assemblies covered in applicant's patent application Ser. No. 166,954 filed July 28, 1971;

FIGS. 12 and 13 show embodiments of the assemblies shown in FIGS. 7 to 11; and

FIGS. 14 to 17 show different embodiments of air damper assemblies in which mechanical counterweights, in accordance with the present invention, oppose the effects of pressure air admitted air to the assemlibes.

The diaphragms used up to now have different shapes and ways of mounting. The simplest is the flat, often circular diaphragm (see FIG. 1) mounted by peripheral pinching. One uses also moulded diaphragms with a special relief and possibly reinforced borders (see FIG. 2). In the central zone one can meet a rigid disc (see FIG. 3) suitable for transmitting some force. To increase the possible stroke one uses a rolling diaphragm (FIG. 4) which is mounted in a cylinder and piston assembly with an important clearance. This diaphragm rolls over the walls of the cylinder and the moving piston.

FIG. 5 illustrates a bellows, quite different from the foregoing diaphragms, and consisting of a tube with thin and flexible walls with a generally circular cross section and an alternately larger and smaller diameter, obtained by deforming or cutting the material. It is mounted for example by pinching the flanges of the bellows. FIG. 6 shows an alternative realized by soldering of flexible discs.

For the sake of completeness one can remember the Bourdon tube, a hollow and incurved flexible tube which deforms when a pressure difference is applied.

In most cases diaphragms and bellows have a circular cross section. Their rigidity often means a non negligible even important element in the balance of forces which rules the shape taken in operation, with relatively small pressure differences. In those cases there is a need for materials with precise and constant elastic properties.

The air dampers as known and commonly used to control the air flows in air conditioning plants are adjusted by hand or by means of electric or penumatic servomotors, the latter being equipped in many cases with diaphragms as shown in FIGS. 1 to 4. These servomotors are energized, under the control of detectors and amplifiers, by a suitable electric or penumatic energy system.

One uses also mechanically operated air dampers, which are adjusted by the balance of a spring and/or counterweight, possibly a damper and the force resulting from air pressures applied by the flowing air to the movable parts which vary the effective area available. In this way a constant flow can be achieved. By varying for example the strain of a spring by means of a servomotor one can also achieve a variable air flow, according to any variable to be controlled.

The FIGS. 8 to 11 show the essence of a diaphragm, the effective area of which is supposed to be almost rectangular, as is seen in FIG. 7. The FIGS. 8 and 9 show two cross sections of such a diaphragm, with a single bag, mounted, and in two different positions: entirely deflated (FIG. 8) and inflated to a maximum volume (FIG. 9). This diaphragm consists of a flattened bag with airtight, thin and flexible walls 1, equipped with a pressure connection 6, it is mounted between two rigid plates 2 and 3, one of which is movable with reference to the other, the kind of relative motion of the two plates 2 and 3 being ruled by a suitable guide (slideway, pivot) not shown here. In principle the relative motion of the plates means a variation of the mean distance between them, the said plates being almost parallel. Practically a rotation with limited amplitude about an axis 7, parallel to the said plates will often be preferred (FIG. 1). In principle the maximum distance H has to be kept small with reference to the actual bag width L of the diaphragm; in this way the stresses in the bag walls are relatively reduced together with the variation of the effective width (Le), as can be demonstrated with ease. In fact, if t represents the thickness of the bag wall, which is supposed to be thin and homogeneous, one can notice:

the stress $s = (P \cdot H)/(2 \cdot t)$ the effective width $Le = L - H \cdot (\pi/2)$.

To perform larger distances or strokes one can use a diaphragm with multiple bags 11, a cross section of which is shown in FIG. 11. The consecutive bags, each quite similar to the bag 1 illustrated in the foregoing FIGS. 7 to 10, communicate with each other through orifices 5, the assembly being airtight by means of a suitable fixation of consecutive bags, for example by gluing or soldering 4. Just as the single bag diaphragm the multiple bag diaphragm is fitted with a pressure connection 6, and mounted between two rigid plates 2 and 3 at a variable mean distance.

It must be pointed out that a multiple bag diaphragm is not a bellows, and behaves quite differently. In fact, its thin and flexible walls have no significant bending resistance and resist only to tensile stresses. The parts of the wall in contact with the rigid plates 2 and 3, or with a consecutive bag do not bend, and have only to eqilibrate the tensile stresses in the free zones with variable radius, at the periphery of the bags. One can even imagine that those flat parts in contact with the rigid plates or with the next bag be made of a more rigid and cheaper material. This particular behavior of the bag allows to realize it with any non-circular effective area, for example a rectangular one, more or less elongated.

One can imagine different manufacturing procedures about single and multiple bag diaphragms. Bag diaphragms can be realized for example from a long tube with very thin and flexible walls with a suitable diameter, obtained by drawing or flowing, the bags being finished and assembled by cutting, soldering and/or gluing. For example the wall can be made of polyethylene foil about 0.05 mm thick.

The FIGS. 12 to 17 schematically show some constructive embodiments of an air damper with a flexible diaphragm, with the embodiments of FIGS. 14 to 17 conforming to the present invention.

First the FIGS. 12 and 13 show a very simple one. This damper comprises, among other things: an inlet chamber 21 and an outlet chamber 22, communicating with each other through an orifice 23 the free area of which can be varied by a movable blade 24 guided in a fixed pivot 7. This movable blade 24 is adjusted by direct contact with a bag diaphragm 11 mounted between the wall of the outlet chamber 22 of the damper, and the same movable blade 24, acting as a rigid plate 3. The said movable blade 24 of the damper built as explained is adjusted by applying a suitable pressure difference to the said diaphragm 11, namely the downstream pressure at the outside, and a controlled pilot pressure inside the bag diaphragm. As in the example shown here the pilot pressure Px can be obtained from a pilot circuit connected upstream and downstream the air damper, the ratio of the pilot branches 31, 32 being varied for example by moving an obturator or pilot 30 at the end of the pilot branch 32. The blade 24 will find a position so that all applied forces make equilibrium.

It is easy to understand that with suitable dimensioning of the parts of the damper and the pilot circuit the damper can be put and held in the closed-, or in the open position, or in an intermediate one, according to the distance between the movable pilot 30 and the end of the pilot branch 32.

The FIG. 14 shows an air damper conforming to the present invention in a different construction, and branched in order to control a constant downstream pressure, P2. One can distinguish an inlet chamber 21, an outlet chamber 22, and a rigid box 12, with inside a movable plate 3 mounted on a fixed pivot 7, and fitted with a counterweight 9. The said plate 3 is loaded by a calibrated spring 8, and exposed to the effect of an inflated bag diaphragm 11. At the tip of the said plate 3 a movable blade 24 is fixed, which is bent and concentric to the aforesaid pivot 7, and slides through a narrow slot in the wall between the box 12 and the chambers 21–22, the said blade thus varying the free area available between the chambers 21 and 22 of the said damper. The inner pressure connection 61 applies the downstream pressure P2 inside the box 12. On the other hand, a pilot pressure Px is applied at the pressure connection 6 of the aforesaid diaphragm 11. The movable assembly will take a position in order to balance all related forces. Due to the shape and the guide of the movable blade 24, the positioning effect of the pressure idfferences applied on it are eliminated. One can see that a pressure difference (Px–P2) will result as fixed by the moment due to the spring 8. If the said spring is mounted with an important pre-strain, an almost constant pressure difference (Px–P2) will result. From the foregoing it is clear that a damper as shown in FIG. 14 can, in principle, achieve a downstream pressure P2 according to the pilot pressure Px, regardless of the upstream pressure P1, the pilot pressure Px being obtainable from a suitable pilot circuit.

Of course, if a damper as explained is fitted in a fresh air duct, connected to a conditioned space 100, the duct section 101 downstream the damper (including elbows, possibly a sound absorber, a grid etc) having a fixed pressure drop characteristic, this arrangement achieves control and regulation of the air flow, if the pilot pressure appears as a relative pressure with respect to the resulting pressure Po, as in the example shown. In fact to any pressure P2 a pressure drop (P2–Po) is associated, and thus a fresh air flow through the air duct section downstream the damper.

To realize a relatively better precision for low flows one can linearize the pressure drop characteristic of the said duct section, by fitting a calibrated resistance with laminar flow 16, as illustrated. This laminar resistance consists of a permeable filling with a low hydraulic diameter; for example an assembly of small diameter tubes, or flat or corrugated sheets mounted at small distances.

The FIG. 15 shows a damper, quite similar to the foregoing but without a spring, and equipped with two similar bag diaphragms 11 and 11' in opposition, the rotating assembly (3 + 24) being balanced by a counterweight 9. The damper is mounted in a return air duct. When applying to the one of the diaphragms (11) a reference pressure PR, to the other one a resulting pressure (for example, the ambient pressure Po in a connected conditioned space 100) one can control the said resulting pressure. Of course, the pressure outside the diaphragms should be lower than the pressures inside, to inflate the diaphragms. This is the case in a damper with an inner pressure connection 6i and mounted in a return air duct as illustrated.

A combination of a fresh air damper according to FIG. 14 and a return air damper according to FIG. 15 can achieve the variable flow ventilation of a closed space, with a controlled resulting pressure.

Further, FIG. 16 shows a damper analogous to, the foregoing, but equipped with two different bag diaphragms (11, 11') in order to obtain a different positioning effect from the pressures applied inside the one and the other diaphragm. Among other things this branching is suitable for adjusting a return air damper (thus in depression) by means of a pilot pressure (higher than ambient) obtained from a pilot circuit (for example conforming to FIG. 12). If for example the diaphragm 11' which gets the pilot pressure Px has only the half of the effective area of the other diaphragm 11 exposed to the resulting pressure Po in the conditioned space (the moment levers about the fixed pivot 7 being the same) it can be easily demonstrated that the system equilibrium implies an air pressure P1 in the inlet chamber 21 of the damper such that approximately Px–Po = Po–P1 or in other terms, due to the calibrated resistance, a return air flow dependent on the said pilot pressure Px.

The same pilot pressure Px can thus adjust a fresh air damper conforming to FIG. 14 and at the same time a return air damper conforming to the present FIG. 16. An assembly as described thus can achieve fresh air and return air flows which are almost equal to each other, if of course the pressure drop characteristics of the duct sections 101, 102 (possibly equipped with calibrated resistances) are balanced in a suitable way.

Finally, the FIG. 17 shows a perfected alternative of a damper conforming to the present invention, which in some way is analogous to the preceding alternatives, but equipped with a box 12 comprising two chambers 13 and 13' and two diaphragms 11 and 11. The latter apply against two movable plates 3, which make a rigid assembly 33, movable about the fixed pivot 7. At one end of this assembly 33 a movable blade 24 is fixed, concentric to the said pivot 7, quite analogous to the examples in the foregoing FIGS. 14 to 16. Possibly the movably assembly (33 + 24) is equipped with a counterweight 9 and a spring 8. In any way, it will take a position sich that the applied forces make equilibrium, and thus the position taken will depend among other things upon the pressure differences DP, DP' applied to the diaphragms 11 and 11'. It has been seen that the rigid box 12 has two chambers 13 and 13' with pressure connections 6, possibly 6i and separated by a common wall. Furthermore, the pierce of the movable assembly 33 mentioned above through the said common wall is fitted with an airtight sealing showing insignificant mechanical reaction, and aligned with the said fixed pivot 7. In this way, one can apply to each of the said diaphragms 11, 11', inside the chambers 13 and 13' respectively any independent pressure differences, the air pressure on the outer face of each of these diaphragms possibly being different from the ambient pressure.

These particularities multiply the branching alternatives of the damper, together with functional possibilities. For example one can apply to one of the diaphragms a pressure drop as induced by a calibrated resistance mounted close to and in series with the damper considered, to the other diaphragm the pressure drop induced by another calibrated resistance fitted in any air duct, in order to "copy" the variable air flow flowing through the just mentioned air duct.

One can imagine with ease a lot of possible combinations, more or less sophisticated, always using one or more bag diaphragms as described above, in order to adjust a movable blade 24 in an air damper, in order to regulate the air flow through it and/or the associated pressure drop, possibly in dependence on a variable to be controlled.

The advantages of an air damper conforming to the present invention resume as follows:

1. Such a damper can achieve different control functions by means of a suitable assemblage and branching of a few constituting very simple elements. It can be used in air conditioning plants with constant or variable air flows, in fresh air and return air ducts as well.
2. Such a damper has a very simple construction, and is cheap; operation is positive, maintenance is minimal.
3. Such a damper can be adjusted without separate energy supply as the pressures of the air flowing in the air ducts suffice; hence mounting is economical, and trouble shooting easy.

I claim:

1. A pneumatic control assembly for maintaing a constant downstream pressure in a conduit comprising, a conduit having an air flow control passage section, casing means forming a chamber, said casing means including wall means in common with said control passage section, said wall means having a transversely extending slot, moveable plate member mounted in said chamber, guide means for guiding the movement of said plate member, said plate member having a blade portion extending through said slot for controlling the opening of said control passage section pursuant to the position of said blade member plate portion, bag means sandwiched between said plate and said casing means, said bag means having first portions thereof fixedly secured to said plate member and said casing means and second portions thereof extending between said plate member and said casing, said second portions being characterized by the absence of any significant bending resistance, and aperture means in said casing for admitting and exhausting air to and from said bag means to bias said plate member in one direction, and weight means gravitally biasing said plate member in the opposite direction from said one direction, an opening in said wall means on the downstream side from said slot for providing fluid communication between the downstream side of said control passage section and the interior of said chamber.

2. A pneumatic control assembly according to claim 1 wherein said bag means is between said plate member and said wall means.

3. A pneumatic control assembly according to claim 1 wherein said plate member has the form of a lever and is pivotally mounted relative to said casing means, said weight means being oppositely fulcrumed relative to said bag means.

4. A pneumatic control assembly according to claim 2 including second bag means on the opposite side of said plate member from said first named bag means, and second aperture means in said casing for admitting and exhausting air to and from said second bag means.

5. A pneumatic control assembly according to claim 4 wherein one of said bag means has a larger cross sectional area than the other of said bag means.

6. A pneumatic control assembly according to claim 1 wherein said plate member has the form of a lever means for pivotally mounting said bag means relative to said casing means, said bag means being on one side of said fulcrum means, second bag means between said plate member and said casing means on the opposite side of said fulcrum means from said first named bag means, and spring means biasing said plate member in the opposite direction from said weight means.

* * * * *